March 29, 1955  E. R. CLARK ET AL  2,705,221
ELECTRIC FILTER
Filed April 30, 1952  4 Sheets-Sheet 1

INVENTORS
EDGAR R. CLARK
WILLIAM J. FRANCEY
HENRY F. HAMLIN
BY
Curtis, Morris & Safford
ATTORNEYS March 29, 1955  E. R. CLARK ET AL  2,705,221
ELECTRIC FILTER
Filed April 30, 1952  4 Sheets-Sheet 2

INVENTORS
EDGAR R. CLARK
WILLIAM J. FRANCEY
HENRY F. HAMLIN
BY
Curtis, Morris & Safford
ATTORNEYS

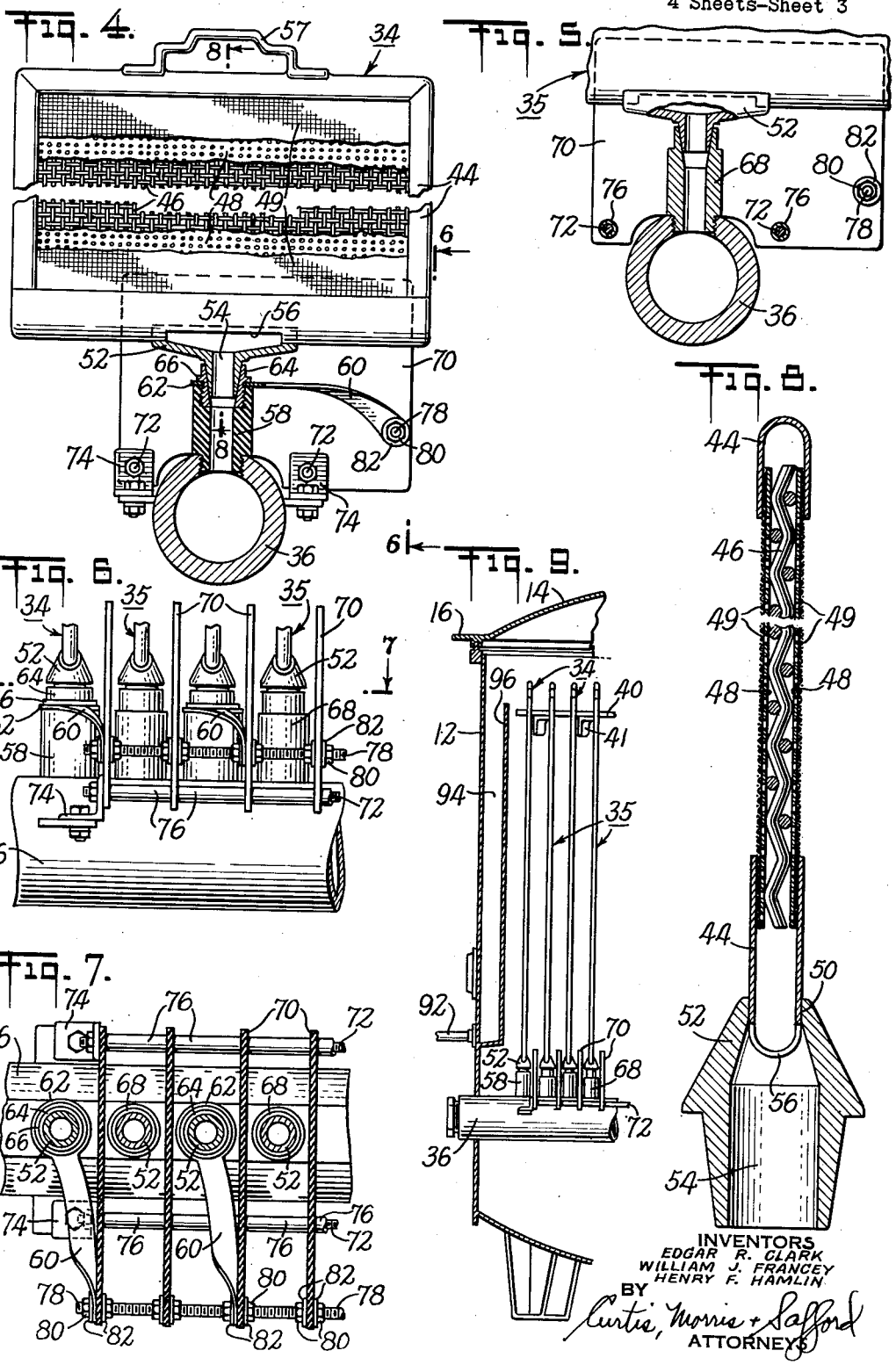
March 29, 1955  E. R. CLARK ET AL  2,705,221
ELECTRIC FILTER
Filed April 30, 1952  4 Sheets-Sheet 3
INVENTORS
EDGAR R. CLARK
WILLIAM J. FRANCEY
HENRY F. HAMLIN
BY Curtis, Morris + Safford
ATTORNEYS March 29, 1955 E. R. CLARK ET AL 2,705,221
ELECTRIC FILTER
Filed April 30, 1952 4 Sheets-Sheet 4
Fig. 10.
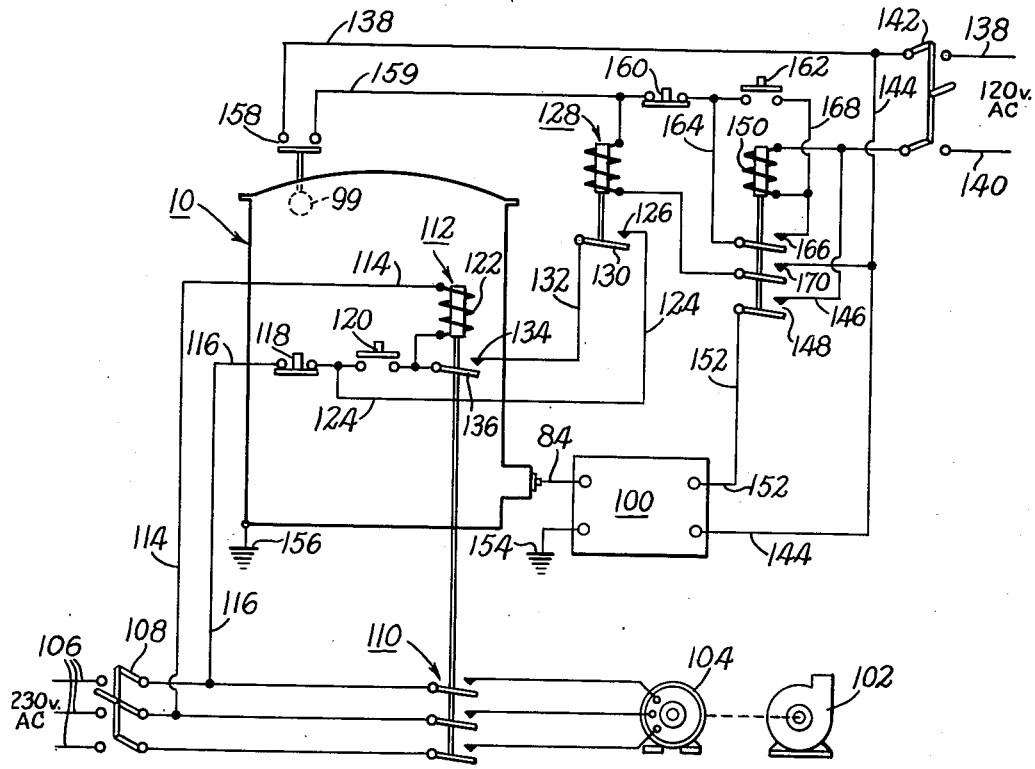
Fig. 11.
Fig. 12.
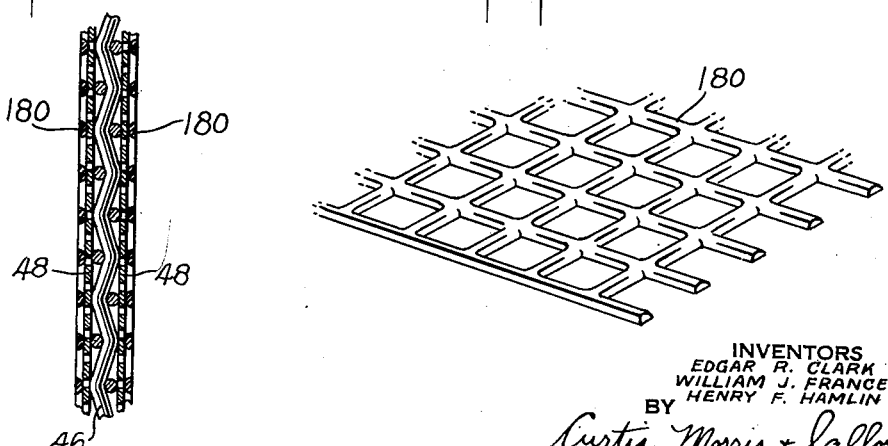
INVENTORS
EDGAR R. CLARK
WILLIAM J. FRANCEY
HENRY F. HAMLIN
BY Curtis, Morris & Safford
ATTORNEYS

United States Patent Office 2,705,221
Patented Mar. 29, 1955

2,705,221

ELECTRIC FILTER

Edgar R. Clark and William J. Francey, Syracuse, and Henry F. Hamlin, Pleasant Valley, N. Y., assignors to U. S. Hoffman Machinery Corporation, New York, N. Y., a corporation of Delaware Application April 30, 1952, Serial No. 285,280

9 Claims. (Cl. 204—306)

This invention relates to filtration and more particularly to an improved method and apparatus for removing suspended solids by filtration from an electrically non-conductive or substantially non-conductive liquid in which they are suspended. The present apparatus is particularly well adapted to be used in clarifying dry cleaning solvents that have suspended therein dust and lint particles that have been removed from clothing and the like in the course of a dry cleaning operation, and will be illustratively described in connection with the filtration of such solvents. However, as the description proceeds it will be apparent that the apparatus may be also used for filtering suspended solids other than dust and lint from liquids other than dry cleaning solvents.

In a typical dry cleaning operation, the goods to be cleaned are washed in a rotating drum with a suitable organic solvent, e. g., naphtha or perchlorethylene, which may or may not contain a soap. The goods to be cleaned contain dust or dirt of the type that is normally airborne and this air-borne dust, since it is insoluble in the solvent, remains suspended therein. In order to remove this suspended matter, the solvent is continuously withdrawn from the washer, passed through a filter and returned to the washer. Since the volume of recirculated solvent is considerable, it is important that the filter used be capable of operating at a relatively high rate.

The nature of the suspended matter in the dry cleaning solvent is such that it tends to plug up the filtering medium when a conventional filter is used. The suspended dirt is finely divided and at least a part of it is somewhat fibrous in character. It rapidly forms a somewhat slimy substantially non-permeable film on the surface of the filtering medium. In order to maintain the filter in operating condition for a reasonable and practicable period of time, it is necessary to use a filter aid, such as for example the prepared diatomaceous earth, sold under the trade name "Filter Cell." However, even when a filter aid is used there is tendency for the filter to become plugged over a period of time. Moreover, the use of a filter aid increases the expense of the filtering operation and also the labor required since it must be introduced into and dispersed in the suspension before filtration and later removed from the filter. In other words, the filter aid is an extraneous material introduced into and later removed from the filter for the sole purpose of postponing the plugging of the filter.

It is accordingly an object of the present invention to provide a filter that is capable of continuously filtering a used dry cleaning solvent at a high rate and without the use of a filter aid.

It is a further object of the invention to provide a filter of this type that provides complete and effective clarification of the solvent and may be operated over a relatively long period of time before the filter requires cleaning.

It is a more general object of the invention to provide an improved filter for removing suspended solids from a non-conductive liquid in which they are suspended.

Other objects of the invention will be in part obvious and in part pointed out hereafter.

The present invention is based upon the discovery that greatly improved filtration of the suspended solids in a used dry cleaning solvent can be achieved by employing electrically charged filter elements. The many objects and advantages of the invention may be best understood and appreciated by referring to the accompanying drawings which illustrate apparatus incorporating a preferred embodiment of the invention. In general, the apparatus shown in the drawings comprises a suitable tank containing a series of parallel hollow filter elements having permeable walls. The suspension to be filtered is pumped into the tank and the liquid flows through the permeable walls of the filter elements to the interiors thereof, whereas the suspended solids are retained at the outside surfaces of the filter elements. The interiors of the filter elements are connected to a liquid discharge manifold through which filtered liquid can be removed from the tank. Alternate filter elements of the series are charged to a relatively high voltage and the elements between the charged filter elements are grounded. It has been found that by thus locating the permeable walls of the filter elements in a high potential electrostatic field, the suspended solids deposit in a relatively open structure and plugging of the filter elements can be prevented.

Referring in more detail to the drawings:

Figure 4 is a partial vertical section taken on the line 4—4 of Figure 2 and showing details of the mounting of one of the charged filter elements and the electrical connections thereto;

Figure 5 is a partial vertical section taken on the line 5—5 of Figure 2 and showing details of the mounting of one of the grounded filter elements;

Figure 6 is a fragmentary side elevation of the manifold taken as indicated in Figure 4 and further showing the mounting and electrical connections of the filter elements;

Figure 7 is a fragmentary horizontal section taken on the line 7—7 of Figure 6 and further showing the electrical connections to the filter elements;

Figure 8 is a vertical section through one of the filter elements taken on a line 8—8 of Figure 4 and showing the internal construction of the elements;

Figure 9 is a partial vertical section taken on a line 9—9 of Figure 2 and showing one of the flow passages through which the suspension flows upon entering the filter tank;

Figure 10 is a wiring diagram of the filter;

Figure 11 is a fragmentary vertical section through a filter element similar to that shown in Figure 8 but of modified construction; and, Figure 12 is a perspective view of a piece of filter screen of the type used in the structure of Figure 11.

Figure 1:
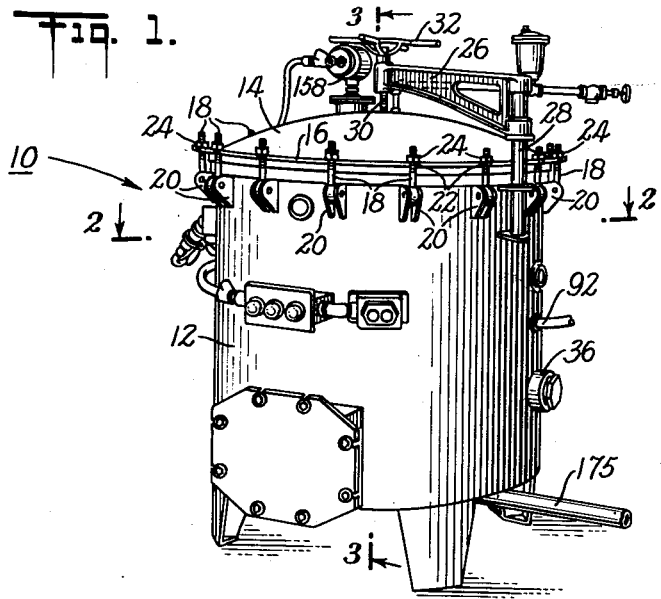
Figure 1 is a general perspective elevation of the filter.
Figure 3:
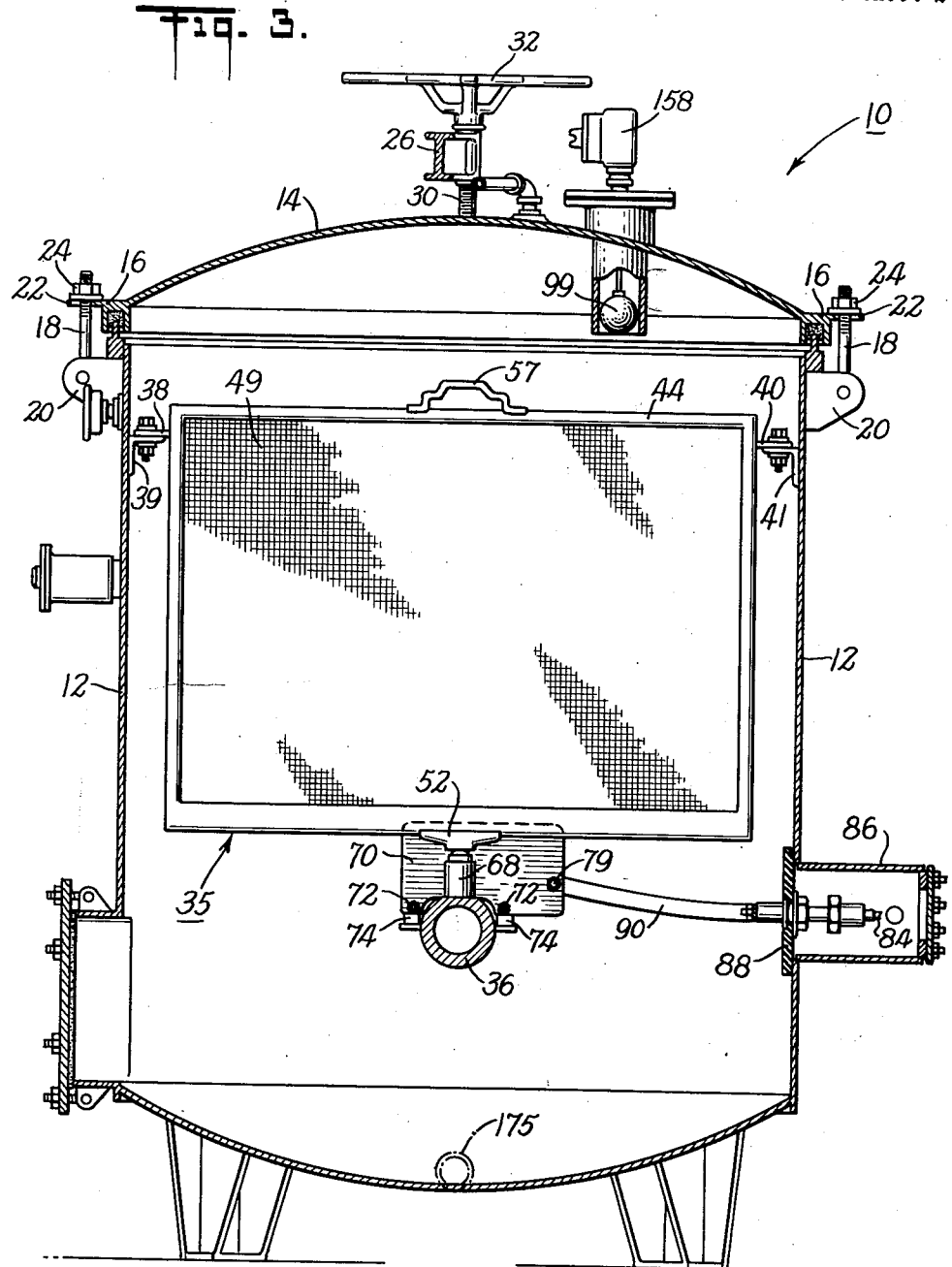
Figure 3 is a central vertical section taken on the line 3—3 of Figure 1 and showing the manner in which the filter elements are mounted on the liquid discharge manifold.

Referring particularly to Figures 1 and 3 of the drawing the filter there shown comprises a tank generally designated 10 and having a casing 12 and removable cover 14 provided with a radially extending flange 16. The cover 14 is held in place on the tank by means of a series of bolts 18 that are pivotally mounted on the brackets 20 fixed to the casing 12. Bolts 18 are normally positioned in a series of slots 22 formed in the flange 16 and are threaded at their upper ends to receive the nuts 24. The bottoms of the nuts 24 normally bear against the top of flange 16 to hold the cover in place on the casing 12. When it is desired to remove the cover the nuts 24 are unscrewed somewhat and swung outward to cause the bolts 18 to pivot with respect to the brackets 20 and move out of the slots 22.

In order to facilitate removal of the cover 14 an arm 26 is provided which is mounted for rotation about a fixed vertical support 28 that is secured to the casing 12 of tank 10. The cover 14 is provided at its center with a rod 30 that extends upwardly through a hole in the arm 26 and is threaded at its upper end to receive a hand wheel 32. When it is desired to remove the cover 14 and after the bolts 18 have been removed from slots 22, hand wheel 32 is rotated to raise the cover until it is clear of casing 12, and arm 26 is then swung about vertical support 28 to swing the cover 14 away from casing 12 and expose the interior of the tank.

Figure 2:
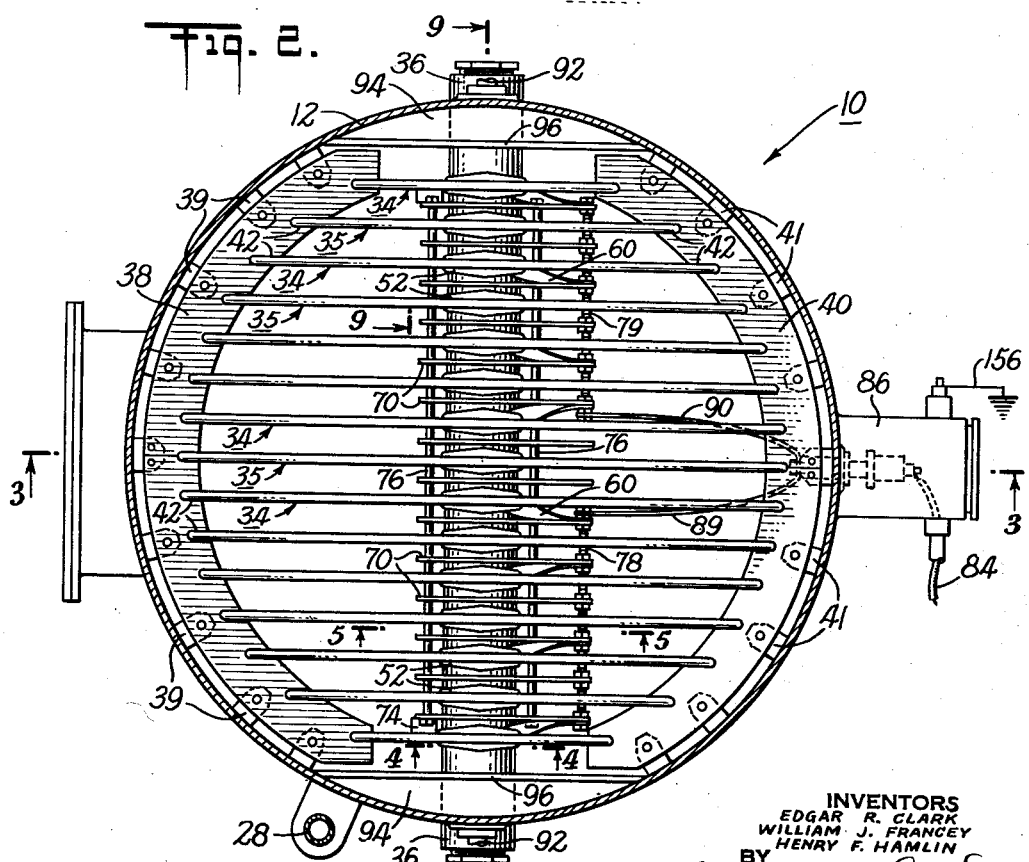
Figure 2 is an enlarged horizontal section taken on the line 2—2 of Figure 1 and showing the arrangement of the filter elements within the filter.

Referring now to Figures 2 and 3 the central portion of the casing 12 contains a series of spaced parallel filter elements comprising the charged filter elements 34 and the similarly constructed grounded filter elements 35. All of the filter elements are supported on a liquid discharge manifold 36 that extends across a diameter of the casing 12 and is fixed to the interior surface thereof. As shown in Figure 2 the filter elements 34 and 35 are of varying widths depending upon whether they are near the center or the sides of the filter tank. In order to provide additional support for the filter elements and ensure proper spacing thereof a pair of arcuate supporting racks 38 and 40 are provided which are bolted to two series of brackets 39 and 41 respectively, that are in turn fixed to the upper inner wall of the casing 12. The racks 38 and 40 are provided with slots 42 adapted to receive and position the filter elements 34 and 35. The racks 38 and 40 are preferably made of an electrical insulating material, e. g., a synthetic plastic.

Construction of the filter elements 34 and 35 is best shown in Figures 4 and 8 of the drawing. Referring to these figures each filter element comprises a rectangular marginal frame 44 of U-shaped cross section which receives and supports a relatively coarse metal screen 46 having a perforated metal plate 48 on each side thereof. Overlying each plate 48 there is a layer of woven metal screen 49 which has preferably been rolled to flatten it somewhat and which provides the primary filtering surface. The frame 44 and its associated screens are mounted in a slot 50 of a liquid discharge nipple 52 that is in turn adapted to be mounted on the manifold 36. The nipple 52 has a central passage 54 which communicates through a hole 56 in the bottom of the frame 44 with the interior of the filter element. As best shown in Figures 3 and 4, each filter element is provided at its top with a handle 57 to facilitate withdrawal of the elements from the filter tank for cleaning.

The mounting of the filter elements on the manifold 36 and the electrical connections to the filter elements are best shown in Figures 4 to 8 of the drawing. Referring first to Figure 4, which shows the mounting of one of the charged filter elements, the manifold 36 is a metal pipe that is drilled and tapped to receive the lower threaded end of an insulating sleeve 58 which may desirably be made of a synthetic plastic. High voltage electrical energy is supplied to the filter element through a branch conductor 60 in the form of metal strip having a ring-shaped end 62 (see also Figure 7) which is positioned against the upper end of sleeve 58. The ring-shaped end 62 of branch conductor 60 is held against sleeve 58 by a metal bushing 64 that is threaded into the upper end of sleeve 58 and has a shoulder 66 that bears against the upper surface of the end 62 of conductor 60. The inner surface of bushing 64 is tapered as shown in Figure 4 to receive the tapered external surface of nipple 52, thereby providing a means whereby the filter element can be readily disconnected from the manifold and withdrawn from the filter tank for cleaning. The bushing 64 and nipple 52 are made of metal and therefore provide a conductive path for the high voltage electricity from branch connector 60 to the main body of the filter element and particularly the screens 49 thereof. The insulating sleeve 58 prevents flow of electricity from branch connector 60 to the manifold 36.

The mounting of the grounded filter elements is best shown in Figure 5. Referring to Figure 5, the manifold 36 is drilled and tapped to receive the threaded lower end of a metal sleeve 68 which is internally flared at its upper end to receive the externally tapered neck of a nipple 52. The cooperating tapered surfaces of sleeve 68 and nipple 52 provide a means whereby the filter element can be readily disconnected from the manifold and withdrawn for cleaning. The tank 10 is electrically grounded and therefore each of the uncharged filter elements is grounded through its nipple 52, sleeve 58, manifold 36 and the casing 12 of tank 10.

In order to prevent short circuiting between the nipples 52 of adjacent filter elements a series of insulating panels 70 is provided with one panel being mounted between each pair of filter elements near the bottom thereof. Referring to Figures 6 and 7 the insulating panels 70 are mounted on a pair of rods 72 positioned parallel to the manifold 36 on opposite sides thereof and supported at their ends on the bracket 74 which are in turn secured to the manifold 36. Spacer tubes 76 are provided between each pair of adjacent panels to insure proper relative positioning of the panels in relation to the nipples 52. As shown in Figure 7, the rods 72 extend through the spacer tubes 76 and panels 70 and thereby support the panels.

Further support for the panels 70 is provided by the bus bars that carry the high voltage electricity supplied to the charged plates. As shown in Figure 2, two such bus bars 78 and 79 are provided, each one serving half of the filter elements. Reverting to Figure 7, the bus bar 78 (which is similar to bar 79) is threaded and extends through the panels 70 at a level somewhat above the rods 72. At the point where the bus bar 78 passes through each panel 70, a pair of nuts 80 are threaded on the bus bar on opposite sides of the panel and bear against washers 82 which in turn bear against the opposite surfaces of the panels 70, thereby securing the panels and bus bar together. The outer end of each branch conductor strip 60 is inserted between one of the insulating panels 70 and a washer 82 in such manner that when the associated nut 80 is tightened up the conductor strip is securely fastened to bus bar 78 and electrically connected thereto.

High voltage electrical energy is supplied to the charged filter elements 34 from a suitable source such as the power pack 100 which is shown only in Figure 10 and will be further described hereafter. Referring to Figures 2 and 3 and particularly the right-hand side of Figure 2, the high voltage lead 84 from the power pack enters a chamber 86 secured to the casing 12 of the filter tank, and then passes to the interior of the filter through an insulating plate 88 that is secured to the inner wall of casing 12. Within the filter the high voltage lead is connected to the branch conductors 89 and 90 which are in turn connected to the bus bars 78 and 79, respectively. Thus, high voltage electricity is conducted from the power pack through conductor 84, branch conductors 89 and 90, bus bars 78 and 79 and branch conductors 60 to the charged filter elements 34.

Still referring to Figure 2 and also referring to Figure 9, the suspension to be filtered is introduced into the filter tank at the diametrically opposite points 92, and initially flows upward through the flow passages 94 which are defined by the tank casing and the baffles or walls 96. The suspension flows over the top of the walls 96 then downwardly between the filter elements and transversely toward the screens 48 of adjacent filter elements. The suspended matter is retained at the outer surfaces of the screens 48 and solvent flows through to the interior of the filter elements, thence downwardly to the manifold 36, and out at the opposite ends of the manifold.

It is important that the liquid level in the filter tank always be above the tops of the filter elements when the elements are charged. To accomplish this objective a float is provided which is best shown in Figure 3. Referring to Figure 3, mounted in the cover 14 of tank 10 there is a housing 98 that extends downwardly into the tank and guides a float 99 that is vertically movable therein and operates an electrical switch in a manner that will be described in connection with the wiring diagram of Figure 10. In the normal operation of the filter, the float 99 is partially immersed in the suspension within the tank 10 and maintains the electric switch closed. If the level of suspension in the tank falls, the float 99 moves downward to open an electrical circuit and thereby interrupt the supply of high voltage energy to the charged filter elements 34 and also interrupt the operation of the pump that supplies suspension to the tank for filtering.

Referring now to Figure 10 of the drawing, which is a wiring diagram in which the apparatus is shown schematically, the suspension to be filtered is supplied to the tank 10 by a pump 102 that is driven by an electric motor 104. Three phase power at a suitable potential, say 230 volts, is supplied to the motor 104 from a suitable source (not shown) through the conductors 106. Interposed in the power supply to motor 104 there is a main switch 108 and the contacts 110 of a relay 112 which forms part of the starting circuit for the motor. The motor starting circuit includes the conductors 114 and 116 which, as shown, are connected to two of the power supply conductors 106; the stop button 118; the start button 120; and the coil 122 of the relay 112. Associated with the starting circuit there is a holding circuit comprising conductor 124 which is connected at one end to the starting circuit between the start and stop buttons and at its other end to one contact 126 of a high voltage interlock relay 128. The other contact 130 of relay 128 is connected by a conductor 132 to a contact 134 of relay 112. Cooperating with contact 134 there is a contact 136 that is connected to the starting circuit between start button 120 and the coil 122 of relay 112.

Assuming that main switch 108 is closed and that relay 128 is energized and contacts 126, 130 are closed, the operation of the starting and holding circuits is as follows: When the start button 120 is pressed the starting circuit is closed to energize coil 122 of relay 112 and thereby close contacts 110 to start the motor 104. When relay 112 is energized contacts 134, 136 are closed to complete the holding circuit, and thus when start button 120 is released relay 112 remains energized and therefore the motor 104 keeps running.

If the high voltage interlock relay 128 is deenergized at the time the start button 120 is pushed, the holding circuit cannot be completed and the motor will operate only so long as the button 120 is held depressed. Also, if while the motor is operating the relay 128 is deenergized, the holding circuit will be broken to cause contacts 110 to open and stop the motor. The relay 128 forms part of the high voltage supply circuit which will now be described.

Referring to the upper right-hand corner of Figure 10, power to operate the power pack 100 is supplied from a suitable alternating current source (not shown) and at a relatively low voltage, say 120 volts, through conductors 138 and 140. A main switch 142 is provided to control the power input. Conductor 138 is connected by a branch conductor 144 to one side of the input of the power pack 100, and conductor 140 is connected through branch conductor 146, contacts 148 of a relay 150 and conductor 152 to the other side of the power pack input. Thus when main switch 142 and relay contacts 148 are closed the power pack 100 is energized.

The power pack 100 is of conventional construction and may, for example, be constructed in accordance with the disclosure of Penney Patent 2,129,783. It operates to convert the relatively low voltage alternating current supplied to it into a high voltage direct current which as previously described is carried by conductor 84 to the charged filter elements in the tank 10. As shown in Figure 10 one output side of the power pack 100 is grounded at 154. Also, as previously indicated the casing of tank 10 is grounded, as for example at 156, to ground the uncharged filter elements within tank 10.

The power supply circuit for power pack 100 includes a starting circuit comprising the conductor 138; a float switch 158 operated by the float 99, which has been previously described; conductor 159; a stop button 160; a start button 162; and the coil of relay 150. Associated with the power pack starting circuit there is a holding circuit including a conductor 164 connected to the starting circuit at one end between stop button 160 and start button 162 and at its other end to one of the contacts 166 of relay 150. The other contact 166 is connected through conductor 168 to the starting circuit between start button 162 and the coil of relay 150. The relay 150 is provided with a third set of contacts 170 that form part of a circuit including the coil of high voltage interlock relay 128, the connections being such that when contacts 170 are closed the coil of relay 128 is connected between conductor 159 and branch conductor 144.

The operation of the power pack supply circuit is as follows: The power pack can in no event be energized so long as the float switch 158 is open. Assuming that the level with the tank 10 is high enough to cause float 99 to close switch 158 and assuming that main switch 142 is closed, when the start button 162 is pressed a circuit is completed including the coil of relay 150, and the armature of relay 150 is actuated to close contacts 148, 166 and 170. The closing of these contacts (a) energizes power pack 100 (b) completes the holding circuit so that start button 162 can be released without deenergizing the power pack and (c) energizes high voltage interlock relay 128 to permit the pump 104 to operate continuously. When the power pack 100 is to be deenergized stop button 160 is pressed to break the starting circuit, and de-energize relays 150 and 128 and power pack 100.

The operation of the present filter should be largely apparent from the foregoing description. The main switches 108 and 142 are initially closed and the start button 120 depressed to operate motor 104 and pump suspension into filter tank until the level within the tank has risen to the point where float switch 158 is closed. Thereupon the starting button 162 for the power pack supply circuit is depressed to energize the power pack and close the contacts of high voltage interlock relay 128, thereby permitting continuous non-manual operation of the pump 102.

Referring to Figures 2 and 9, the suspension is introduced into the filter tank at inlets 92, flows upwardly through the flow passages 94 over the tops of walls 96 and downwardly between the filter elements. The elements 34 are charged to a relatively high direct current voltage, say 13,000 volts, and at this voltage are preferably spaced about 2″ from the uncharged elements. The solvent flows through the screens 49 of both the charged and grounded elements to the interiors of the elements, downwardly into the manifold 36 and out of the filter, whereas the suspended matter is retained at the surfaces of the filter element. The pump 102 maintains the suspension under a sufficient pressure to produce the desired flow of solvent through the filter.

As previously pointed out, solids are deposited in a relatively open structure on the surfaces of the filter elements and plugging of the filtering medium is avoided. While we do not wish to be bound by any particular theory of operation, it is our present understanding that the suspended particles on entering the electrostatic field between the charged and grounded filter elements become oriented and are attracted to the filter elements in oriented position, so that the matting and packing of the suspended matter characteristic of non-electrical operation is avoided. This theory of operation is supported by the fact that the particles are attracted equally to the charged and grounded filter elements and also by the fact that when the filter elements are deenergized, and the cover of the filter removed, the deposit is readily removable from the surface of the filter elements. Moreover it has been found that with the present filter particles are removed from the solvent that are considerably smaller than the openings in the screens 49. In other words effective separation of the suspended solids and solvent can be achieved when using a foraminous medium that would not effect a satisfactory separation in the absence of an electro-static field.

During the operation of the filter the float 99 and its associated switch 158 insure that the electrical circuit will not be broken unless the liquid is above the tops of the filter elements. Thus, any danger of the formation of an explosive mixture within the filter is avoided. The insulating panels or shields 70 prevent short circuits between the supporting nipples 52 of adjacent filter elements.

When it becomes necessary to clean the filter the stop buttons 118 and 160 are depressed to de-energize power pack 100 and stop motor 104. The cover 14 of the filter tank is removed and the filter elements 34 and 35 removed for cleaning. It has been found that upon de-energization of the filter elements and also during their removal from the tank a considerable part of the filter cake becomes disengaged and falls to the bottom of the tank as a sludge. As shown in Figures 1 and 3 a drain pipe 175 is provided at the bottom of the filter tank through which this sludge can be removed and the tank drained. It has been further found that due to the relatively open structure of the filter cake the portions of the cake adhering to the filter elements when they are withdrawn from the tank can be removed with comparatively little trouble.

It is of course to be understood that the foregoing description is illustrative and that numerous changes in the number arrangement and construction of the filter elements, as well as modifications of other features of the apparatus may be made within the scope of the invention. The fine screen 49 may be an ordinary woven metal screen as shown in Figures 4 and 8 of the drawings or it may be an electro-formed screen such as the screen 180 of Figure 12. The screen 180 is of a known type and may be made for example as described in Norris Patent 2,226,384. As shown in Figure 12 it is characterized by the fact that the lands of the screen are flat on one side to provide a smooth plane screen surface on one side of the screen. As shown in Figure 11 the electro-formed screen is preferably mounted over the perforated plate 48 with its flat surface on the outside of the filter element. It has been found that effective filtration of a dry cleaning solvent can be obtained with an 80-mesh electro-formed screen of this type, notwithstanding the fact that the holes in the screen were many times larger than the smallest particles to be filtered. Moreover the electro-formed screen presents an advantage because of the flat surfaces of the lands of the screen. As previously indicated the solids deposit at the outer surface of the filtering element, and since the surface of the electro-formed screen is flat the solids can be removed therefrom relatively easily and completely by brushing or scraping.

It is also possible to substitute for the screen 49 a fibrous fabric filtering medium of the type that is conventionally used in known types of filters. Other variations in operating procedure and modifications in structure within the scope of the invention will be apparent to those skilled in the art.

Spacing of the filter elements 34 and 35 and the voltage used are inter-related, and in general it is desirable to use a potential gradient of the order of 6000 volts per inch. The filter cake deposited on the filter elements has a relatively low density; and hence as it accumulates on the surface of the filter element it extends outwardly a considerable distance from the surface of each element. Therefore it has also been found desirable to use a spacing of at least about two inches between adjacent filter elements.

From the foregoing description it is apparent the present invention provides an unusually effective filter especially useful in the clarification of dry cleaning solvents. The arrangement of closely spaced filter elements, alternately charged and grounded, provides a relatively large filter area per unit volume of filter tank. Also the electro-static field between the filter elements causes the solids to deposit in a relatively open structure, thereby making it unnecessary to use filter aids, and increasing the period during which the filter can be operated between successive cleanings. Since substantially all of the electrically charged areas within the filter are effective filtering areas the capacity of the filter is large in relation to its size.

Since many embodiments might be made of the present invention and since many changes might be made in the embodiment disclosed herein, it is to be understood that the foregoing description is to be interpreted as illustrative only and not in a limiting sense. The present application is a continuation-in-part of our prior application Serial No. 42,418 filed August 4, 1948, and now abandoned.

We claim:

1. A filter adapted to be used in clarifying dry cleaning solvents, comprising in combination a tank for containing a body of said liquid to be filtered, a manifold mounted in said tank for collecting filtered liquid and conducting it to a point outside said tank, a first and second series of filter elements connected to the manifold, the filter elements of said second series being interposed between adjacent filter elements of said first series, each of said filter elements comprising a relatively coarse foraminous framework made of an electrically conductive metal, a relatively finely porous, permeable medium in thin sheet form encasing said framework and a conduit arranged to interconnect the interior of said element with said manifold, electrical insulating means interposed between said manifold and each filter element of said first series, a main conductor extending through the wall of said tank and electrically insulated from said tank, means for supplying high voltage direct current to said main conductor, a series of branch conductors within said tank electrically interconnecting said main conductor and the filter elements of said first series to charge the conductive frameworks thereof to a high voltage, said tank and manifold being made of electrically conductive material and being grounded to ground the conductive frameworks of filter elements of said second series, and means for supplying to said tank liquid containing suspended solids to be filtered therefrom.

2. A filter according to claim 1 and wherein the finely porous, permeable medium is a fibrous fabric.

3. A filter according to claim 1 and wherein the finely porous, permeable medium is a rolled woven wire screen.

4. A filter according to claim 1 and wherein the finely porous, permeable medium is an electroformed screen having lands with co-planar flat surfaces confronting the body of liquid to be filtered.

5. A filter adapted to be used in clarifying dry cleaning solvents, comprising in combination a tank for containing a body of said liquid to be filtered, a tubular manifold extending across said tank near the bottom thereof for collecting filtered liquid and conducting it to a point outside said tank, a first and second series of filter elements mounted on and above the manifold, the filter elements of said second series being interposed between adjacent filter elements of said first series, each of said filter elements comprising a relatively coarse foraminous framework made of an electrically conductive metal, a relatively finely porous permeable medium in thin sheet form encasing said framework and a conduit connecting said element with said manifold, said conduit having a tapered lower end engaging a similarly tapered connection in said manifold to facilitate removal of said elements from said tank, electrical insulating means interposed between said manifold and each filter element of said first series, a main conductor extending through the wall of said tank and electrically insulated from said tank, means for supplying high voltage direct current to said main conductor, a series of branch conductors within said tank electrically interconnecting said main conductor and the filter elements of said first series to charge the conductive frameworks thereof to a high voltage, said tank and manifold being made of an electrically conductive material and being grounded to ground the conductive frameworks of filter elements of said second series, and means for supplying to said tank liquid containing suspended solids to be filtered therefrom.

6. A filter according to claim 5 and wherein said insulating means comprises tubular insulators interposed between said manifold and each element of said first series, said insulators being arranged to conduct filtered liquid from said first series elements to said manifold.

7. A filter according to claim 5 and wherein insulating panels are mounted on said manifold between the conduits of adjacent filter elements.

8. A filter adapted to be used in clarifying dry cleaning solvents, comprising in combination a tank for containing a body of said liquid to be filtered, a tubular manifold extending across said tank near the bottom thereof for collecting filtered liquid and conducting it to a point outside said tank, a first and second series of filter elements mounted on and above the manifold, the filter elements of said second series being interposed between adjacent filter elements of said first series, each of said filter elements comprising a relatively coarse foraminous framework made of an electrically conductive metal, a relatively finely porous permeable medium in thin sheet form encasing said framework and a conduit connecting said element with said manifold, electrical insulating means interposed between said manifold and each filter element of said first series, a main conductor extending through the wall of said tank and electrically insulated from said tank, means for supplying high voltage direct current to said main conductor, a series of branch conductors within said tank electrically interconnecting said main conductor and the filter elements of said first series to charge the conductive frameworks thereof to a high voltage, said tank and manifold being made of an electrically conductive material and being grounded to ground the conductive frameworks of filter elements of said second series, a float mounted near the top of said tank and responsive to the liquid level therein, and an electrical control circuit for controlling energization of said high voltage source including a switch actuated by said float to close said switch when said float rises and open said switch when said float falls, said circuit being arranged to energize said source only when said float switch is closed.

9. A filter adapted to be used in clarifying dry cleaning solvents, comprising in combination a tank for containing a body of said liquid to be filtered, a tubular manifold extending across said tank near the bottom thereof for collecting filtered liquid and conducting it to a point outside said tank, a first and second series of filter elements mounted on and above the manifolds, the filter elements of said second series being interposed between adjacent filter elements of said first series, each of said filter elements comprising a relatively coarse foraminous framework made of an electrically conductive metal, a relatively finely porous permeable medium in thin sheet form encasing said framework and a conduit connecting said element with said manifold, electrical insulating means interposed between said manifold and each filter element of said first series, a main conductor extending through the wall of said tank and electrically insulated from said tank, means for supplying high voltage direct current to said main conductor, a series of branch conductors within said tank electrically interconnecting said main conductor and the filter elements of said first series to charge the conductive frameworks thereof to a high voltage, said tank and manifold being made of an electrically conductive material and being grounded to ground the conductive frameworks of filter elements of said second series, a float mounted near the top of said tank and responsive to the liquid level therein, an electrical control circuit for controlling energization of said high voltage source and including a switch actuated by said float to close said switch when said float rises and open said switch when said float falls, an electric-motor driven pump for pumping liquid to be filtered to said tank and an electrical control circuit for said pump, said pump control circuit being interconnected with said high voltage source control circuit to prevent operation of said pump unless said source is energized.

References Cited in the file of this patent

UNITED STATES PATENTS 2,054,075    Fisher _____ Sept. 15, 1936

FOREIGN PATENTS 3,888    Great Britain _____ Feb. 14, 1914